US006498627B1

(12) United States Patent
Hershey et al.

(10) Patent No.: US 6,498,627 B1
(45) Date of Patent: Dec. 24, 2002

(54) USE OF WIDEBAND DTV OVERLAY SIGNALS FOR BREVITY SIGNALING AND PUBLIC SAFETY

(75) Inventors: John Erik Hershey, Ballston Lake, NY (US); Mark Lewis Grabb, Burnt Hills, NY (US); Kenneth Brakeley Welles, II, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/422,441

(22) Filed: Oct. 21, 1999

(51) Int. Cl.[7] ............................ H04N 5/21; H04N 5/44; H04N 7/025; H04N 7/10; H03D 1/00; H04L 27/06; H04K 1/10

(52) U.S. Cl. ......................... 348/725; 348/614; 725/33; 375/340; 375/260

(58) Field of Search ................................ 348/725, 729, 348/614, 611, 607; 375/260, 340, 346, 285; 370/526–528, 493–495, 332–333; 725/33

(56) References Cited

U.S. PATENT DOCUMENTS 4,155,042 A * 5/1979 Permut et al. ................ 725/33
4,476,488 A * 10/1984 Merrell ........................ 725/33
5,103,310 A * 4/1992 Gibson et al. .............. 358/141
5,121,430 A * 6/1992 Ganzer et al. .............. 380/258
5,136,531 A * 8/1992 McCaslin ................... 708/312
5,512,935 A * 4/1996 Majeti et al. ................. 725/33
5,748,677 A * 5/1998 Kumar ........................ 375/285
5,930,308 A * 7/1999 Schmutz ..................... 375/340
6,304,299 B1 * 10/2001 Frey et al. .................. 348/614

* cited by examiner

*Primary Examiner*—John Miller
*Assistant Examiner*—Paulos Natnael
(74) *Attorney, Agent, or Firm*—John F. Thompson; Jill M. Breedlove

(57) ABSTRACT

A brevity signaling module for a digital television (DTV) receiver enables the reception of emergency broadcast messages. The overlay signal received at the receiver front end is squared in a squaring loop, producing spectral lines at DC and twice the overlay signal frequency, or $2\omega$, where $\omega=2\pi f$ and f is the center frequency of the overlay signal. The squared signal is passed through a narrow band filter having a bandwidth sufficient to pass a spectrum containing a plurality of tones $2\omega, 2\omega_1, 2\omega_2, \ldots, 2\omega_n$, where $2\omega_1, 2_2, \ldots, 2\omega_n$ are different frequency tones assigned to different auxiliary functions. The detected tone is used by a control module to determine whether normal multipath processing should be performed or whether this processing should be suppressed and auxiliary functions performed, including turning on the DTV receiver power in order that an emergency broadcast message might be conveyed to persons in the vicinity of the DTV receiver.

24 Claims, 2 Drawing Sheets

USE OF WIDEBAND DTV OVERLAY SIGNALS FOR BREVITY SIGNALING AND PUBLIC SAFETY

CROSS REFERENCE TO RELATED PATENT APPLICATION

This patent application is related in subject matter to patent application Ser. No. 09/201,376 filed Nov. 30, 1998, by M. L. Grabb, N. Al-Dhahir, R. L. Frey, J. E. Hershey, and N. A. VanStralen, for "System and Method for Mitigating Multipath Effects in Television Systems". The disclosure of application Ser. No. 09/201,376 is incorporated herein by reference.

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to digital televison (DTV) and, more particularly, to use of an overlay signal in the DTV transmission for brevity signaling for public safety.

2. Background Art

High definition television (HDTV) is an emerging technology that is capable of providing service either in analog or digital format. In the United States, research on HDTV has focused on digital, rather than analog, technology. While digital HDTV is not currently available, Japanese companies have developed an HDTV system based on analog technology (known as Hivision) that has been in use since 1991. Because of the potential advantages of digital HDTV and many technical problems shared by both types of systems, research in digital HDTV has also been active in Japan. See, for example, David K. Kahaner in "HDTV Research in Japan", *IEEE Micro,* Oct. 1993, pp. 49–53.

One of the most important prevalent problems in DTV is that of multipath. In fact, it is useful to think of the DTV channel as multipath limited and not power limited. Multipath may arise from fixed structures acting as reflectors in the transmission channel, such as building walls. Moving objects, such as airplanes, may also cause a multipath condition. Even microreflections in cabling can cause multipath. See, for example, P. T. Marhiopoulos and M. Sablatash, "Design of a Ghost Canceling Reference Signal for Television Systems in North America", *Proceedings of Canadian Conference on Electrical and Computer Engineering*, Vancouver, BC, Canada, Sep. 14–17 1993, pp. 660–663.

It has been proposed, as described in commonly assigned copending patent application Ser. No. 09/201,376, filed Nov. 30, 1998, that the DTV transmitter overlay a wideband signal in order to provide a way to characterize the multipath limited channel in order to mitigate multipath effects. This signal would be processed by receivers equipped to do so, but would not adversely affect the picture produced by receivers not so equipped; that is, the technique is backward compatible.

The Emergency Alert System (EAS) is a valuable government service that provides timely and crucial warning to customers of public broadcast media. As recently as 1997, the new EAS system replaced the older Emergency Broadcast System (EBS). The upgraded system allows for less obtrusive testing and converts many of the its messages into digital formats. As digital television (DTV) matures, it will provide a challenge to make better use of the publicly owned spectrum to better serve the public. One important way to do this is to upgrade communications for public safety and the commonweal to even higher levels.

SUMMARY OF THE INVENTION

A brevity signaling module for a digital television (DTV) receiver enables reception of emergency broadcast messages. The overlay signal received at the receiver is squared, producing spectral lines at DC and twice the overlay signal frequency, or $2\omega$, where $\omega=2\pi f$ and f is the center frequency of the overlay signal. The squared signal is analyzed to determine which of different frequency tones, $2\omega$, $2\omega_1$, $2\omega_2, \ldots, 2\omega_n$, is present, where the different frequency tones $2\omega_1, 2\omega_2, \ldots, 2\omega_n$ are assigned to different functions. The detected tone is used by a control module to determine whether normal multipath processing should be performed or whether this processing should be suppressed and auxiliary functions performed, including turning on the DTV receiver power in order that an emergency broadcast message might be conveyed to persons in the vicinity of the DTV receiver.

DETAILED DESCRIPTION OF THE INVENTION

It has been proposed that the DTV transmitter overlay a wideband, relatively low power, noise-like transmission on the 8-VSB (vestigal sideband) DTV signal in order to provide a convenient and highly effective way to fine-grain characterize the multipath limited channel in order that multipath effects may be mitigated and ghosting caused by multipath significantly reduced. One way to provide an overlay signal is simply to generate a wideband signal and add it to the DTV signal prior to final amplification and transmission. A well known way of generating such a wideband signal is to use a high speed, known and predictable but random appearing, binary source to modulate a carrier as is done with binary phase shift keying (BPSK). The power of the overlay signal can be made much smaller than the host DTV signal so as to cause no interference. It will, however, be possible to estimate a feature of the wideband overlay signal without first demodulating the signal. The overlay signal OS(t), as described, may be written as $$OS(t)=b(t)\sin(\omega t),$$

where b(t) is the bit from the high speed sequence generator that is present at time t and $b(t) \in \{\pm 1\}$.

Figure 1:
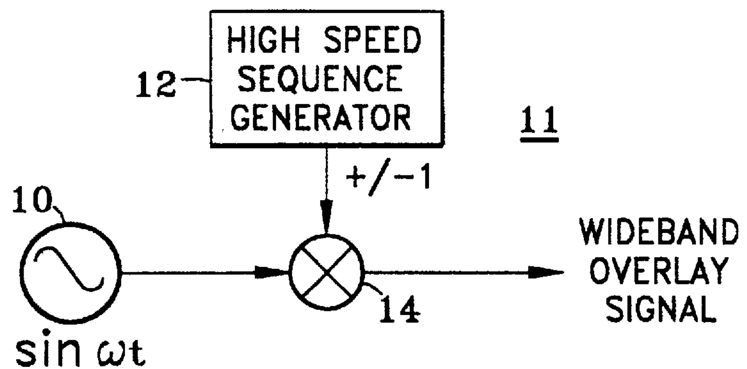
FIG. 1, is a block diagram of a high speed overlay generator as used in a DTV transmitter.

As shown in FIG. 1, a signal source 10 of overlay generator 11 generates a signal $\sin(\omega t)$ which is combined with the output signal of a high speed sequence generator 12 in a mixer 14 to produce the wideband overlay signal. The overlay signal generator is constructed according to established and general principles in the art which require synchronization such that sin(ωt) be zero at the transitions between the high speed sequence generator bit boundaries.

Figure 2:
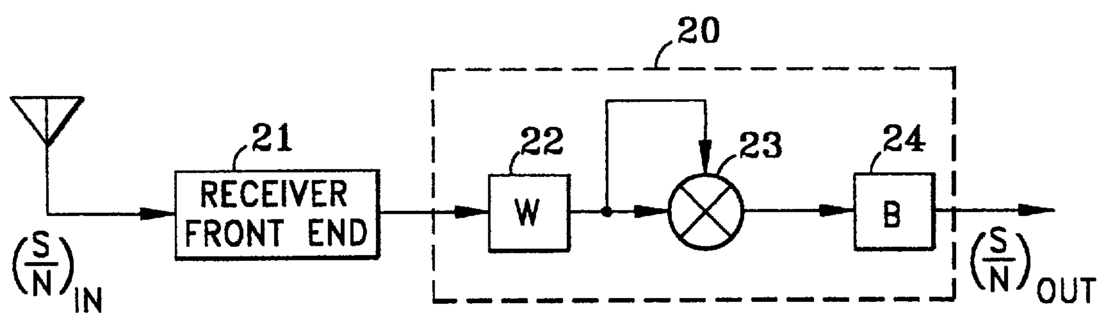
FIG. 2 is a block diagram of a squaring loop as used to generate a frequency tone from the overlay signal.
Figure 3:
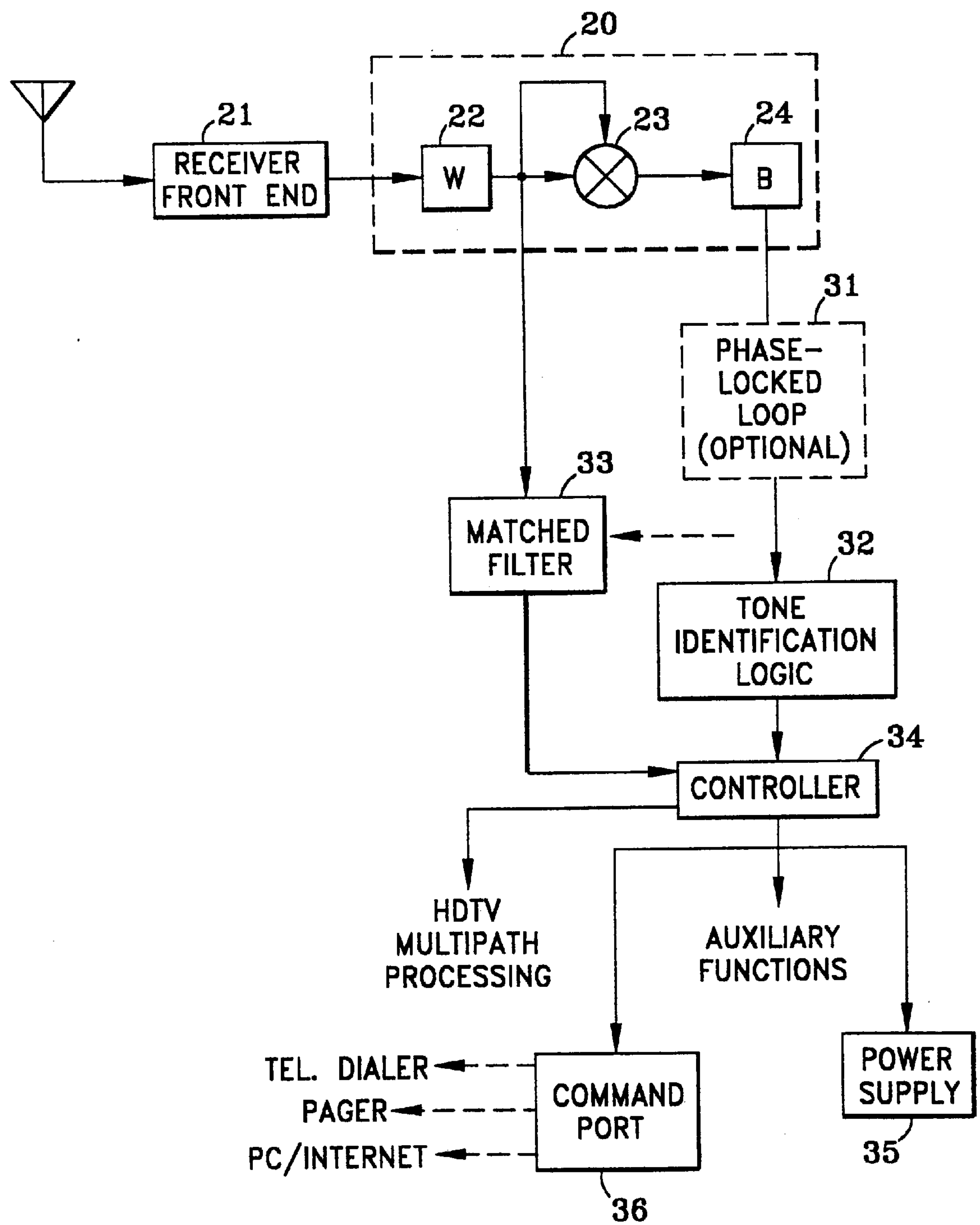
FIG. 3 is a block diagram of a brevity signaling receiver module according to a preferred embodiment of the invention.

As shown in FIG. 2, signals received by the receiver front end 21 are converted to intermediate frequency signals that are provided to a wide bandpass filter 22 in squaring loop 20. The filter 22 spectral width W is just wide enough to pass the main lobe of the overlay signal that is centered at ω. The output signals of filter 22 are provided to a multiplier 23 which squares the wideband overlay signal passed by filter 22. This operation generates a spectral line at 2ω. The output signals of multiplier 23, in turn, are provided to a narrow bandbass filter 24 of bandwidth B. The bandwidth B is appropriately centered and just sufficient to pass the spectrum containing a plurality of tones $2\omega, 2\omega_1, 2\omega_2, \ldots, 2\omega_n$. By making the assumption that the overlay signal is immersed in additive white Gaussian noise, and that its SNR (signal-to-noise ratio) into the squaring loop apparatus of FIG. 2 is $[S/N]_{IN}$, and that its SNR out of the apparatus is $[S/N]_{OUT}$, it is well known that $[S/N]_{OUT}=\frac{1}{2}[S/N]_{IN}^2 W/B$. This relationship is used in the invention to provide a brevity signaling service for public safety functions. The brevity signaling receiver is shown in FIG. 3 and can be used to support dissemination of messages of the Emergency Alert System (EAS) and other public safety systems under the aegis of the Federal Communications Commission (FCC), the National Weather Service (NWS), the Federal Emergency Management Administration (FEMA), among other federal agencies, as well as state and local offices. But the system goes further than the EAS does today. Currently, the EAS signal is detected and the public is alerted only if the radio or TV is on at the time of the signal. With the brevity signal receiver module of the invention, it is possible to add functionality to a DTV receiver that will cause the receiver to turn on in response to an EAS message and provide a timely alert to those who might otherwise miss it. The power required to maintain this monitoring capability during receiver off periods can be made minimal.

With reference to FIG. 3, squaring loop 20 as shown and described with reference to FIG. 2 provides an output signal from narrow band filter 24 to an optional phase locked loop 31. The phase-locked loop can be inserted to provide greater short term stability, should there be fast flat fading or other such condition that would decrease $[S/N]_{IN}$. The output signal of narrow bandbass filter 24, or of phase-locked loop 31, if present, is provided to tone identification logic 32. The tone identification logic determines which of the tones $2\omega, 2\omega_1, 2\omega_2, \ldots, 2\omega_n$ is present, and may do this in a number of ways.

A preferred embodiment for the tone identification logic is to present the input signal to a bank of narrowband filters, each filter centered about one of the n+1 frequencies $2\omega, 2\omega_1, 2\omega_2, \ldots, 2\omega_n$, and each filter being sufficiently spectrally narrow that its passband does not encompass other than the single tone at its center. The output signals of the filters are compared, and the one that has the highest power is declared to correspond to the particular tone intended from the set $2\omega, 2\omega_1, 2\omega_2, \ldots, 2\omega_n$.

An alternative preferred embodiment for the tone identification logic is to Fourier transform the input signal and search for the frequency bin containing the largest magnitude. This frequency bin would also correspond to the particular tone.

The particular tone identified by tone identification logic 32 is supplied to a controller 34. In normal operation, the detected tone is at frequency 2ω and controller 34 then provides an output signal to the multipath processing subsystem. When a shift in tone is detected, that is, when the frequency of the detected tone is not 2ω but rather one of $2\omega_1, 2\omega_2, \ldots$, or $2\omega_n$, controller 34 enables the appropriate auxiliary function(s), including turning on the main power supply 35 to the DTV receiver so that persons in the vicinity of the DTV receiver will be notified of an emergency broadcast message as may be appropriate.

Another appropriate auxiliary function is activation of an external communications device via a command port 36. Upon detection of a predesignated tone, e.g., $2\omega_k$, controller 34 causes command port 36 to produce an appropriately formatted command to activate an automatic telephone dialer, pager, or personal computer connected to the Internet as by a modem. Once so activated, the external device sends a prestored message to a prestored number or address. The prestored message conveys the information that the EAS system has been activated.

The brevity signaling receiver module of FIG. 3 functions as follows. In normal operation, the wideband overlay signal is centered at a known center frequency and the signal is used for a DTV channel equalization function. When an EAS message must be sent, the DTV broadcaster shifts the center of the wideband overlay signal to another frequency, which may be only a specific, single frequency or one of a plurality of other frequencies. The new center frequency is tied to the category of the EAS message. When the brevity signaling receiver module detects the shift of the center frequency, controller 34 signals the appropriate DTV receiver circuits that the wideband overlay signal is temporarily not to be used for channel equalization but rather is being used to convey an EAS message. An EAS message can be conveyed by modulating the sequence data (see FIG. 1) by, for example, inverting/non-inverting sequence periods to signal ones and zeros. Controller 34 then determines which auxiliary function is to be performed. For example, one function may be to turn on the DTV receiver so that the message can be brought to the attention of the occupants in a dwelling in which the DTV receiver is present.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A brevity signaling module for a digital television (DTV) receiver which is equipped to receive and process a wideband overlay signal used for multipath processing, the brevity signaling module being adapted to enable reception of emergency broadcast messages and comprising:

a receiver front end for receiving and detecting the wideband overlay signal;

a squaring loop for squaring the detected wideband overlay signal detected by the receiver front end to generate a spectral line at 2ω, where ω=2πf and f is the overlay signal center frequency, said squaring loop including a narrow band filter having a bandwidth sufficient to pass a spectrum containing a plurality of tones $2\omega, 2\omega_1, 2\omega_2, \ldots, 2\omega_n$, where $2\omega_1, 2\omega_2, \ldots, 2\omega_n$ are different frequency tones assigned to different auxiliary functions;

tone identification logic to detect, in the spectrum produced by said filter, a transmitted tone corresponding to one of the tones $2\omega, 2\omega_1, 2\omega_2, \ldots, 2\omega_n$; and a control module responsive to the tone identification logic to determine whether normal multipath processing should be performed or whether multipath processing should be suppressed and auxiliary functions performed.

2. The brevity signaling module recited in claim 1, wherein one of said auxiliary functions is power control and further comprising a DTV power supply responsive to said control module for turning on the DTV receiver power in order that an emergency broadcast message might be conveyed to persons in the vicinity of the DTV receiver.

3. The brevity signaling module recited in claim 1, further comprising a command port responsive to said control module for signaling an emergency message.

4. The brevity signaling module recited in claim 3, including, coupled to said command port, at least one of the group consisting of an automatic telephone dialer, a pager, and an Internet connection.

5. The brevity signaling module recited in claim 1, wherein said tone identification logic includes a plurality of narrow band filters for passing a respective one of the frequency tones $2\omega$, $2\omega_1$, $2\omega_2$, . . . , $2\omega_n$.

6. The brevity signaling module recited in claim 1 wherein said tone identification logic includes Fourier transform logic to generate a plurality of frequency bins corresponding to the frequency tones $2\omega$, $2\omega_1$, $2\omega_2$, . . . , $2\omega_n$, respectively.

7. A receiver comprising:

a receiver front end for receiving and detecting a wideband overlay signal;

a squaring loop for squaring the detected wideband overlay signal to generate a spectral line at $2\omega$, where $\omega=2\pi f$ and f is the overlay signal center frequency;

a narrow band filter having a bandwidth sufficient to pass a spectrum containing a plurality of tones $2\omega$, $2\omega_1$, $2\omega_2$, . . . , $2\omega_n$, where $2\omega_1$, $2\omega_2$, . . . , $2\omega_n$ are different frequency tones assigned to different auxiliary functions;

tone identification logic to detect, in the spectrum produced by said filter, a transmitted tone corresponding to the center frequency of the overlay signal; and a control module responsive to the tone identification logic to determine whether an auxiliary function should be invoked.

8. The receiver recited in claim 7, further comprising a command port responsive to said control module for signaling an emergency message.

9. The receiver recited in claim 8 including, coupled to said command port, at least one of the group consisting of an automatic telephone dialer, a pager, and an Internet connection.

10. The receiver recited in claim 7, wherein one of said auxiliary functions is control of power and further comprising a power supply responsive to said control module for turning on the receiver by supplying power thereto in order that a broadcast message might be conveyed to persons in the vicinity of the receiver.

11. The receiver recited in claim 7 wherein said tone identification logic includes a plurality of narrow band filters for passing a respective one of the frequency tones $2\omega$, $2\omega_1$, $2\omega_2$, . . . , $2\omega_n$.

12. The receiver recited in claim 7 wherein said tone identification logic includes Fourier transform logic to generate a plurality of frequency bins corresponding to the frequency tones $2\omega$, $2\omega_1$, $2\omega_2$, . . . , $2\omega_n$, respectively.

13. A method of signaling for a digital television (DTV) receiver which is equipped to receive and process a wideband overlay signal used for multipath processing, the method of signaling enabling reception of emergency broadcast messages and comprising the steps of:

receiving and detecting the wideband overlay signal;

squaring the detected wideband overlay signal to generate a spectral line at $2\omega$, where $\omega=2\pi f$ and f is the overlay signal center frequency;

filtering the squared overlay signal in a narrow band filter having a bandwidth sufficient to pass a spectrum containing a plurality of tones $2\omega$, $2\omega_1$, $2\omega_2$, . . . , $2\omega_n$, where $2\omega_1$, $2\omega_2$, . . . , $2\omega_n$, are different frequency tones assigned to different auxiliary functions;

detecting a transmitted tone corresponding to the tones $2\omega$, $2\omega_1$, $2\omega_2$, . . . , $2\omega_n$; and determining whether normal multipath processing should be performed or whether multipath processing should be suppressed and auxiliary functions performed.

14. The method of signaling recited in claim 13, further comprising the step of activating an auxiliary signaling device in response to a determination that an emergency message should be transmitted as one of said auxiliary functions.

15. The method of signaling recited in claim 14, wherein the auxiliary signaling device includes at least one of the group consisting of an automatic telephone dialer, a pager, and a modem for connection to the Internet.

16. The method of signaling recited in claim 13, wherein one of said auxiliary functions is control of power and further comprising the step of turning on the DTV receiver power in order that an emergency broadcast message might be conveyed to persons in the vicinity of the DTV receiver.

17. The method of signaling recited in claim 13, wherein the step of detecting a transmitted tone includes the step of filtering the squared overlay signal in a plurality of narrow band filters passing a respective one of the frequency tones $2\omega$, $2\omega_1$, $2\omega_2$, . . . , $2\omega_n$.

18. The method of signaling recited in claim 13, wherein the step of detecting a transmitted tone includes the step of performing a Fourier transform to generate a plurality of frequency bins corresponding to the frequency tones $2\omega$, $2\omega_1$, $2\omega_2$, . . . , $2\omega_n$, respectively.

19. A method of signaling for a receiver which is equipped to receive and process a wideband overlay signal, the method of signaling enabling reception of broadcast messages and comprising the steps of:

receiving and detecting the wideband overlay signal;

squaring the detected wideband overlay signal to generate a spectral line at $2\omega$, where $\omega=2\pi f$ and f is the overlay signal center frequency;

filtering the squared overlay signal in a narrow band filter having a bandwidth sufficient to pass a spectrum containing a plurality of tones $2\omega$, $2\omega_1$, $2\omega_2$, . . . , $2\omega_n$, where $2\omega_1$, $2\omega_2$, . . . , $2\omega_n$ are different frequency tones assigned to different auxiliary functions;

detecting a transmitted tone corresponding to the tones $2\omega$, $2\omega_1$, $2\omega_2$, . . . , $2\omega_n$; and determining whether auxiliary functions are to be performed.

20. The method of signaling recited in claim 19, further comprising the step of activating an auxiliary signaling device in response to a determination that an emergency message should be transmitted as one of said auxiliary functions.

21. The method of signaling recited in claim 20, wherein the auxiliary signaling device includes at least one of the group consisting of an automatic telephone dialer, a pager, and a modem for connection to the Internet.

22. The method of signaling recited in claim 19, wherein one of said auxiliary functions is control of power and further comprising the step of turning on the receiver power in order that a broadcast message might be conveyed to persons in the vicinity of the receiver.

23. The method of signaling recited in claim 19, wherein the step of detecting a transmitted tone includes the step of filtering the squared overlay signal in a plurality of narrow band filters passing a respective one of the frequency tones $2\omega, 2\omega_1, 2\omega_2, \ldots, 2\omega_n$.

24. The method of signaling recited in claim 19, wherein the step of detecting a transmitted tone includes the step of performing a Fourier transform to generate a plurality of frequency bins corresponding to the frequency tones $2\omega$, $2\omega_1, 2\omega_2, \ldots, 2\omega_n$, respectively.

* * * * *